United States Patent
Janosik et al.

(10) Patent No.: US 6,688,783 B2
(45) Date of Patent: Feb. 10, 2004

(54) METHOD OF FABRICATING AN OPTICAL MODULE INCLUDING A LENS ATTACHED TO A PLATFORM OF THE OPTICAL MODULE

(75) Inventors: Zbigniew Janosik, Cedar Grove, NJ (US); Robert Wallace Roff, Westfield, NJ (US); Chia-Fu Hsu, Plainsboro, NJ (US)

(73) Assignee: Princeton Lightwave, Inc., Cranbury, NJ (US)

( * ) Notice: Subject to any disclaimer, the term of this patent is extended or adjusted under 35 U.S.C. 154(b) by 0 days.

(21) Appl. No.: 10/103,694

(22) Filed: Mar. 25, 2002

(65) Prior Publication Data

US 2003/0180014 A1 Sep. 25, 2003

(51) Int. Cl.$^7$ ................................................. G02B 6/36
(52) U.S. Cl. ........................... 385/93; 385/49; 385/52; 385/88; 385/89; 385/90; 385/91; 385/92
(58) Field of Search ........................... 385/38, 49, 52, 385/88–93

(56) References Cited

U.S. PATENT DOCUMENTS

| | | | | |
|---|---|---|---|---|
| 5,195,155 A | * | 3/1993 | Shimaoka et al. | 385/90 |
| 5,930,429 A | * | 7/1999 | Trott | 385/93 |
| 6,207,950 B1 | * | 3/2001 | Verdiell | 250/239 |
| 6,522,486 B2 | * | 2/2003 | Furuhashi et al. | 359/819 |
| 2003/0026548 A1 | * | 2/2003 | Bourcier et al. | 385/52 |

* cited by examiner

Primary Examiner—Brian Healy
Assistant Examiner—Daniel Petkovsek

(57) ABSTRACT

A method of fabricating an optical module includes attaching a lens to a platform of the optical module such that the lens remains in precise alignment with a light source (e.g., a laser diode) and a target optical fiber even after the lens is attached or fixed to the platform. The optical module includes a micro-lens assembly, comprising a bridge and a micro-lens holder holding a micro-lens. The micro-lens holder is initially to the light source to substantially optimize coupling of light into the input aperture of the optical fiber. Next, the bridge is inserted beneath the micro-lens holder on the platform. Subsequently, the bridge is fixedly attached to the platform. The micro-lens holder is realigned to the light source to substantially optimize coupling of light into the input aperture of the optical fiber and then the micro-lens holder is fixedly attached to the bridge.

9 Claims, 4 Drawing Sheets

METHOD OF FABRICATING AN OPTICAL MODULE INCLUDING A LENS ATTACHED TO A PLATFORM OF THE OPTICAL MODULE

BACKGROUND OF THE INVENTION

1) Field of the Invention

This invention pertains to the field of optical modules, and more particularly, to a method of fixing a lens in an optical module.

2) Description of the Related Art

FIG. 1 shows an exemplary optical module 100. The optical module 100 is a so-called "butterfly module," so named because it has a plurality of electrical leads 105 (e.g., seven) extending from first and second sides 102, 104 on opposite sides of the optical module 100, and an output optical fiber 110 extending from a third side 106 generally perpendicular to the first and second sides 102, 104. The optical module 100 also includes platform 120 on which is mounted a laser diode 130 which supplies light output to an input aperture 112 of the optical fiber 110.

A critical characteristic of the optical module 100 is the alignment of the light output of the optical module 100 and the input aperture 112 of the optical fiber 110. Especially in the case of a single mode fiber, it is critically important that the light output of the laser diode 130 be precisely aligned with the input aperture 112 of the optical fiber 110.

In the optical module 100, a lens 140 (sometimes referred to as a micro-lens) focuses the light out of the laser diode 130 onto the input aperture of the optical fiber 110. It is important that the micro-lens 140 be located in precise alignment with the laser diode 130 the optical fiber 110. The optical module 100 also includes an optical isolator 180 for preventing light coming back out of the input aperture 112 of the target optical fiber 110 from going back into the laser diode 130.

However, in the prior art, when attaching the micro-lens 140 to the platform 120, the micro-lens 140 is subject to significant misalignment with respect to the laser diode 130 and the optical fiber 110.

Accordingly, it would be advantageous to provide an improved method of fabricating an optical module. In particular, it would be advantageous to provide such a method including an improved method of fixedly attaching a lens to a platform of the optical module such that the lens remains in precise alignment with a light source (e.g., a laser diode) and a target optical fiber even after it is attached or fixed to the platform. Other and further objects and advantages will appear hereinafter.

SUMMARY OF THE INVENTION

The present invention comprises a method for fabricating an optical module, including a method of fixedly attaching a lens to a platform of the optical module such that the lens remains in precise alignment with a light source (e.g., a laser diode) and a target optical fiber even after it is attached to the platform.

In one aspect of the invention, a method is provided for fabricating an optical module including a light source producing light, an optical fiber having an input aperture aligned to receive the light, a ferrule fit around an exterior of the optical fiber, a micro-lens assembly comprising a bridge and a micro-lens holder holding a micro-lens, and a platform. The method comprises holding the optical fiber in place at a desired location with respect to the laser diode; initially aligning the micro-lens to the laser diode to substantially optimize coupling of light into the input aperture of the optical fiber; inserting the bridge beneath the micro-lens holder on the platform; fixing the bridge to the platform; realigning the micro-lens to the laser diode to substantially optimize coupling of light into the input aperture of the optical fiber; and fixing the micro-lens holder to the bridge.

DESCRIPTION OF THE PREFERRED EMBODIMENTS

Figure 1:
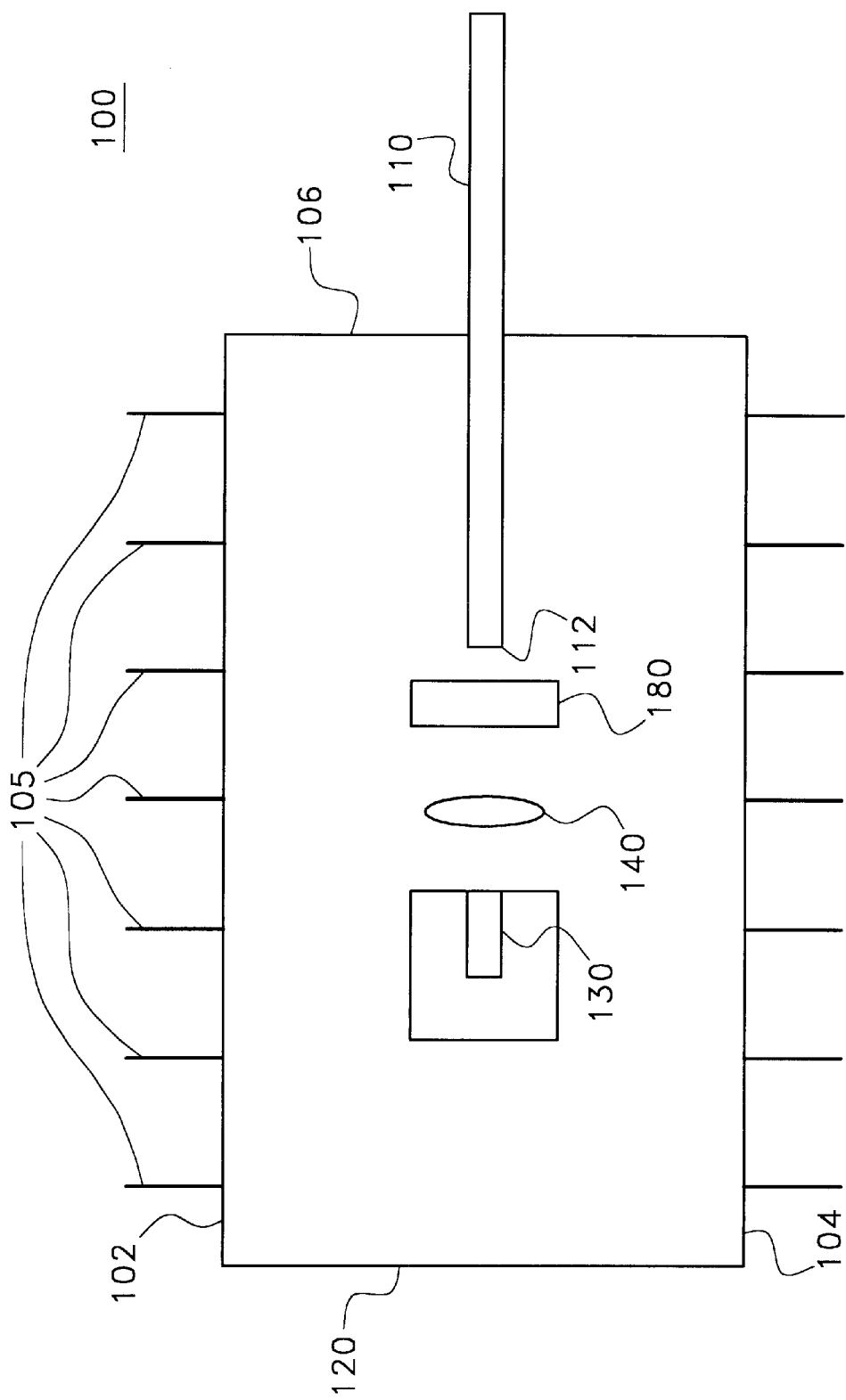
FIG. 1 is a diagram of an exemplary "butterfly" type optical module.
Figure 2:
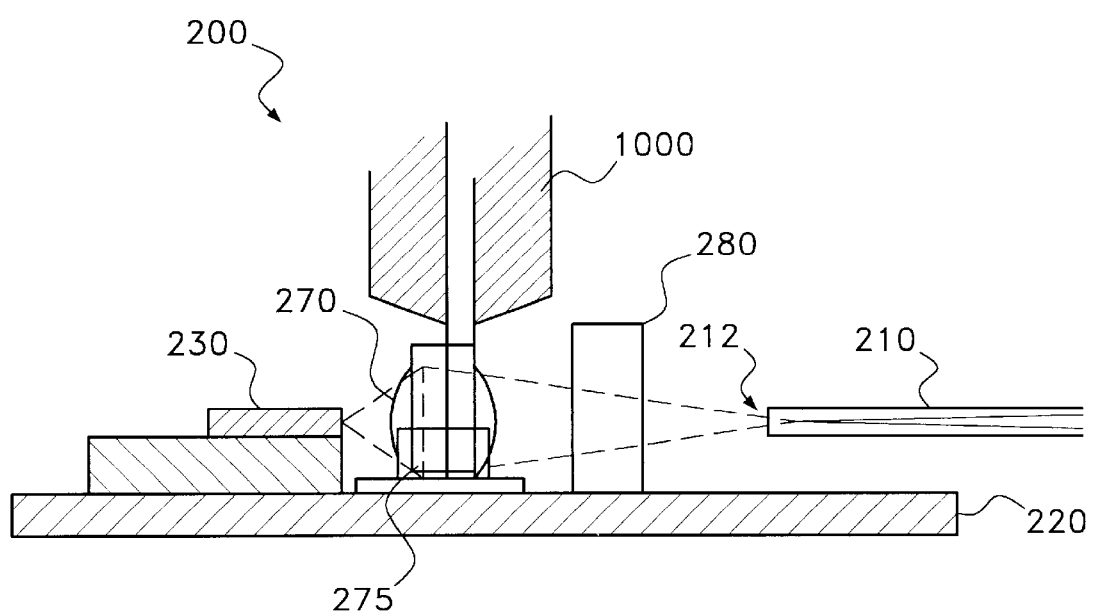
FIG. 2 is a side view of an optical module, illustrating a method of aligning a micro-lens to a laser diode and fixing the micro-lens to a platform.

FIG. 2 shows a side view of a portion of an optical module 200. Portions of the optical module 200, such as electrical leads, having no bearing on the present invention are not shown so as not to obscure the present invention. In relevant part, the optical module 200 includes a target optical fiber 210, a platform 220, a light source (e.g., a laser diode 230), and a micro-lens assembly 270 including a micro-lens 275. The micro-lens 270 is adapted to focus light from the laser diode 230 onto the input aperture 212 of the target optical fiber 210. Accordingly, the micro-lens 275 is to be precisely aligned in an optical path between the laser diode 230 and the input aperture 212 of the target optical fiber 210 for optimally (e.g., maximally) delivering light to the input aperture 212.

Figure 3:
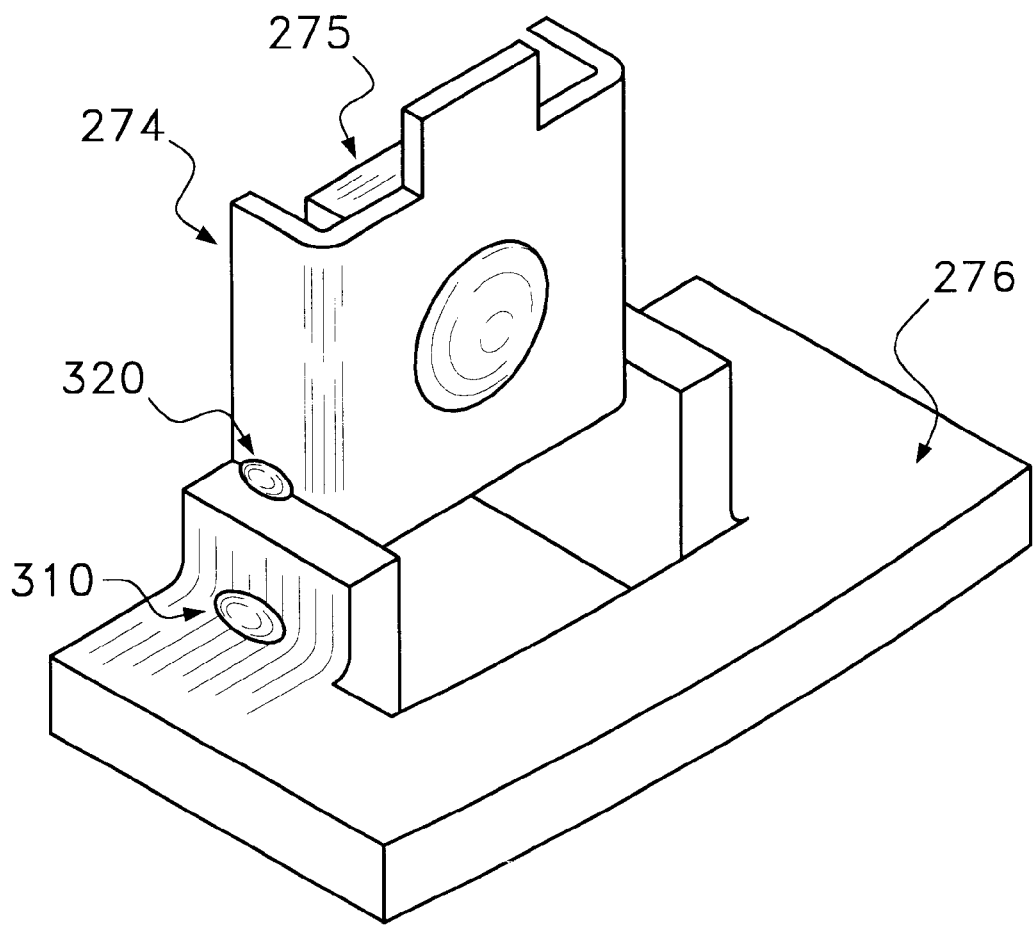
FIG. 3 is a perspective view of a micro-lens assembly adapted for use in an alignment method disclosed herein.

Beneficially, as shown in FIG. 3, in accordance with an attachment method disclosed herein, the micro-lens assembly 270 comprises a bridge 276 and micro-lens holder 274 holding the micro-lens 275. Further details of the micro-lens assembly 270 will be discussed below.

Beneficially, the optical module 200 also includes an optical isolator 280 for preventing light coming back out of the input aperture 212 of the target optical fiber 210 from going back into the laser diode 230. In that case, beneficially, the bridge 276 is made of a non-ferrous material, such as nickel, so as not to affect the optical isolator 280.

For the optical module 200, it is necessary to properly align the micro-lens 275 between the laser diode 230 and the input aperture 212 of the target optical fiber 210. Alignment of the isolator 280, however, is not required, as its precise position is not critical.

Figure 4:
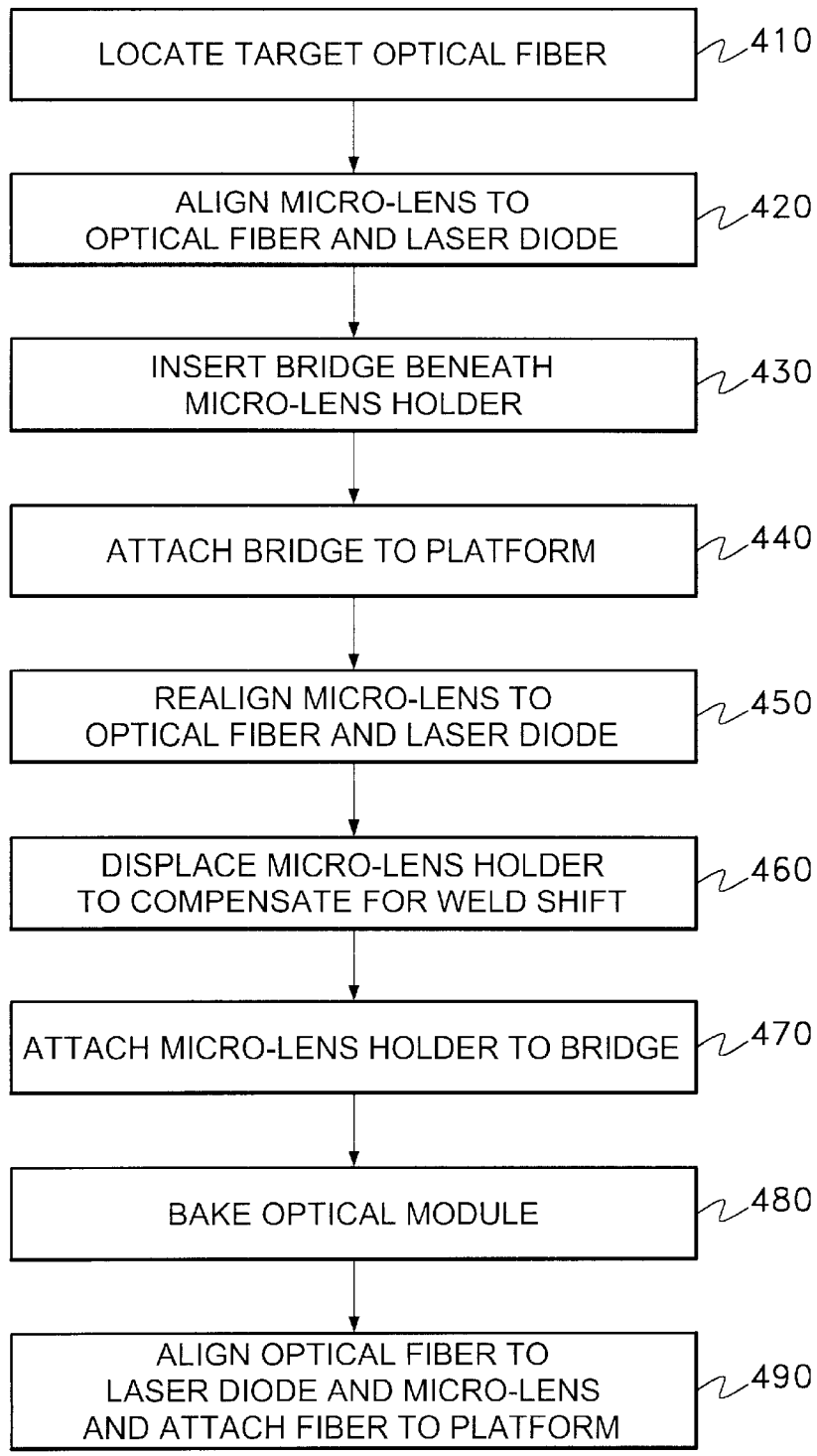
FIG. 4 is a flowchart illustrating steps of a method of aligning an a laser diode, a micro-lens, and an optical fiber in an optical module.

FIG. 4 illustrates steps of a method 400 of attaching the micro-lens 275 to the platform 220 in precise alignment with the target optical fiber 210 and the laser diode 230. As alignment of the isolator 280 is not necessary for proper operation, it may be fixed to the platform 220 prior to commencement of the alignment method 400 or subsequent thereto.

In a first step 410, a target optical fiber 210 is placed into a desired location with respect to the laser diode 230 above the platform 220. At this time, the lens holder assembly 270 is not placed on the platform 220. Also, at this point, the target optical fiber 210 is not fixed to the platform 220, but instead it is just held in place, for example by a mechanical arm, while the micro-lens 275 is aligned in the following steps.

In a next step 420, the micro-lens 275, together with the micro-lens holder 274, is aligned in relation to the laser diode 230 and the target optical fiber 210 to focus the light from the laser diode 230 onto the aperture 212 of the target optical fiber 210. At that time, the bridge 276 is physically detached from the micro-lens holder 274. In this step, an alignment tool 1000 may be used to position the lens micro-holder 274 with respect to the laser diode 230 and the platform 220. Beneficially, a feedback system is used to control the alignment tool 1000. To align the micro-lens 275 with respect to the laser diode 230 and target optical fiber 210 for substantially optimal light coupling, an output end of the target optical fiber 210 is connected to a measurement apparatus for measuring an intensity of light emerging from the optical fiber 210. Based on the measured light intensity, the measurement apparatus produces a feedback signal that is used to control the alignment tool 1000 to achieve a substantially optimal (e.g., a substantial maximum) coupling of light from the laser diode 230 into the input aperture 212 of the target optical fiber 210. The alignment tool 1000 continues to move the micro-lens holder 274 until a substantially optimal light coupling into the target optical fiber 210 is achieved.

After the micro-lens 275 is aligned to focus the light from the laser diode 230 onto the aperture 212 of the target optical fiber 210, then in a step 430, the bridge 276 is inserted beneath the micro-lens holder 274 in place on the platform 220.

Then, in a step 440, the bridge 276 is fixedly attached to the platform 220, preferably by welding it to the platform 220 by means of a first set of welds 310, as shown in FIG. 3.

Next, in a step 450, the position of the micro-lens holder 274 is again adjusted to realign the micro-lens 275 to more precisely focus the light from the laser diode 230 onto the aperture 212 of the target optical fiber 210 to again achieve a substantially optimal (e.g., a substantial maximum) coupling of light from the laser diode 230 into the input aperture 212 of the target optical fiber 210. As in the step 420, beneficially a feedback arrangement is employed to determine the optimal position of the micro-lens holder 474 and the micro-lens 275.

Next, in a step 460, the micro-lens holder 274 is moved vertically with respect to the bridge 276 by a predetermined amount to account for a settling of the micro-lens holder 274 that will occur after cooling of the welds produced during a subsequent welding step 470. In a preferred embodiment, the cooling of the welds will produce a negative vertical displacement of the optical fiber 210 of 10–12 $\mu$m with respect to the bridge 276. Accordingly, before the welding step 360, the optical fiber 210 is moved vertically with respect to the optical platform 220 by 10–12 $\mu$m, beneficially 11 $\mu$m.

Then, in a step 470, the micro-lens holder 274 is fixedly attached to the bridge 276, preferably by means of a second set of welds 320, as shown in FIG. 3.

Next, in a step 480, the optical module is baked for an extended period of time at an elevated temperature in order to relieve stresses associated with the welding process so that the components will settle before a final step 490.

Finally, in a step 490, the target optical fiber 210 is fixedly attached to the platform 220 in alignment with the laser diode 230 and the micro-lens 275.

As disclosed above, a method is provided for fixedly attaching a lens to a platform of an optical module such that the lens remains precisely aligned with a laser diode and a target optical fiber even after the lens is attached to the platform.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of fabricating an optical module including a light source producing light, an optical fiber having an input aperture aligned to receive the light, a micro-lens assembly comprising a bridge and a micro-lens holder holding a micro-lens, and a platform, the method comprising:

holding the optical fiber in place at a desired location with respect to the light source;

initially aligning the micro-lens to the light source to substantially optimize coupling of light into the input aperture of the optical fiber;

inserting the bridge beneath the micro-lens holder on the platform;

fixing the bridge to the platform;

realigning the micro-lens to the light source to substantially optimize coupling of light into the input aperture of the optical fiber; and fixing the micro-lens holder to the bridge.

2. The method of claim 1, wherein fixing the bridge to the platform includes welding the bridge to the platform.

3. The method of claim 1, wherein fixing the micro-lens holder to the bridge includes welding the micro-lens holder to the bridge.

4. The method of claim 1, wherein initially aligning the micro-lens holder to the light source to substantially optimize coupling of light into the input aperture of the optical fiber, comprises:

measuring light emerging from an output of the optical fiber; and moving the micro-lens holder until a substantially optimal coupling of light into the input aperture of the optical fiber exists.

5. The method of claim 1, wherein initially aligning the micro-lens to the light source to substantially optimize coupling of light into the input aperture of the optical fiber, comprises:

grasping the micro-lens holder with a mechanical arm;

measuring light emerging from an output of the optical fiber;

providing a feedback signal to control movement of the mechanical arm based upon the measured light;

moving the mechanical arm in response to the feedback signal until a substantially optimal coupling of light into the input aperture of the optical fiber exists.

6. The method of claim 1, wherein realigning the micro-lens to the light source to substantially optimize coupling of light into the input aperture of the optical fiber, comprises:

measuring light emerging from an output of the optical fiber; and moving the optical fiber until a substantially optimal coupling of light into the input aperture exists.

7. The method of claim 1, wherein realigning the micro-lens holder to the light source to substantially optimize coupling of light into the input aperture of the optical fiber, comprises:

grasping the micro-lens holder with a mechanical arm;

measuring light emerging from an output of the optical fiber.

providing a feedback signal to control movement of the mechanical arm based upon the measured light;

moving the mechanical arm in response to the feedback signal until a substantially optimal coupling of light into the input aperture exists.

8. The method of claim 1, further comprising moving the micro-lens holder by a predetermined amount with respect to the bridge prior to attaching the micro-lens holder to the bridge.

9. The method of claim 8, further comprising baking the optical module after fixing the micro-lens holder to the bridge.

* * * * *